(12) United States Patent
Tennenbaum et al.

(10) Patent No.: US 6,549,899 B1
(45) Date of Patent: Apr. 15, 2003

(54) SYSTEM FOR ANALYZING AND SYNTHESIS OF MULTI-FACTOR DATA

(75) Inventors: Joshua B. Tennenbaum, Portola Valley, CA (US); William T. Freeman, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 710 days.

(21) Appl. No.: 08/970,824

(22) Filed: Nov. 14, 1997

Related U.S. Application Data

(60) Provisional application No. 60/031,008, filed on Nov. 15, 1997.

(51) Int. Cl.[7] .............................................. G06F 17/30
(52) U.S. Cl. .............................. 707/6; 707/1; 707/503; 709/219
(58) Field of Search ................................ 707/1, 503, 6; 364/728.5, 736.3, 724.11, 723; 428/141; 358/1.15–1.16; 385/59; 709/219

(56) References Cited

U.S. PATENT DOCUMENTS

| | | | | | |
|---|---|---|---|---|---|
| 4,750,147 A | * | 6/1988 | Roy et al. | .................... | 364/807 |
| 4,965,732 A | * | 10/1990 | Roy et al. | .................... | 364/460 |
| 5,121,337 A | * | 6/1992 | Brown | .................... | 364/498 |
| 5,148,488 A | * | 9/1992 | Chen et al. | .................... | 381/47 |
| 5,267,139 A | * | 11/1993 | Johnson | .................... | 364/148 |
| 5,446,681 A | * | 8/1995 | Gethner et al. | .................... | 364/554 |
| 5,459,473 A | * | 10/1995 | Dempster et al. | .................... | 342/357 |
| 5,459,668 A | * | 10/1995 | Dogan et al. | .................... | 364/456 |
| 5,517,115 A | * | 5/1996 | Prammer | .................... | 364/303 |
| 5,579,243 A | * | 11/1996 | Levine | .................... | 364/553 |
| 5,640,429 A | * | 6/1997 | Michels et al. | .................... | 375/340 |
| 5,748,507 A | * | 5/1998 | Abatzoglou et al. | .................... | 364/572 |
| 5,781,880 A | * | 7/1998 | Su | .................... | 704/207 |
| 5,798,942 A | * | 8/1998 | Danchick et al. | .................... | 364/516 |
| 5,828,999 A | * | 10/1998 | Bellegarda et al. | .................... | 704/240 |
| 5,839,105 A | * | 11/1998 | Ostendorf et al. | .................... | 704/256 |
| 5,844,613 A | * | 12/1998 | Chaddha | .................... | 348/416 |

* cited by examiner

Primary Examiner—Jean M. Corrielus
(74) Attorney, Agent, or Firm—Dirk Brinkman

(57) ABSTRACT

The present invention provides a system for analyzing multi-factor data according to a separable mixture model to classify, extrapolate, and translate data. A separable mixture model represents each data point as a function of underlying factors and corresponding parameters. With two factors, the factors can be referred to as style and content. In particular, a particular data point can be represented according to a separable mixture model, as a combination of the product of parameter vectors for each of the factors. The system accommodates symmetric and asymmetric models of interactions of parameter vectors, which are selected based upon the known data and the desired analysis. Using a selected model and known data, the system generates relevant parameters describing the known data. The parameter vector information can then be used to analyze and synthesize test data. In classification, unknown data in a new style is classified as to content, or vice versa. In extrapolation, complete content in a new style is generated from a set of observations in the new style. In translation, data having both new style and content is used to generate complete sets of content and style corresponding to the new data. The system is applicable to many types of multi-factor or 2-factor data, including typography, voice recognition, face recognition with varying poses or illuminations, and color constancy.

17 Claims, 4 Drawing Sheets

| 340 | 310 CLASSIFICATION | | | |
|---|---|---|---|---|
| A | B | C | D | E |
| 𝒜 | ℬ | 𝒞 | 𝒟 | ℰ |
| 𝔄 | 𝔅 | ℭ | 𝔇 | 𝔈 |
| A | B | C | D | E |
| 𝔸 | 𝔹 | ℂ | 𝔻 | 𝔼 |
| B | C A | E | | D |

Figure 1A 350

| 320 EXTRAPOLATION | | | | 340 |
|---|---|---|---|---|
| A | B | C | D | E |
| 𝒜 | ℬ | 𝒞 | 𝒟 | ℰ |
| 𝔄 | 𝔅 | ℭ | 𝔇 | 𝔈 |
| A | B | C | D | E |
| 𝔸 | 𝔹 | ℂ | 𝔻 | 𝔼 |
| ? | ? | C | D | E |

| 330 TRANSLATION | | | | 340 | | | |
|---|---|---|---|---|---|---|---|
| A | B | C | D | E | ? | ? | ? |
| 𝒜 | ℬ | 𝒞 | 𝒟 | ℰ | | | |
| 𝔄 | 𝔅 | ℭ | 𝔇 | 𝔈 | | | |
| A | B | C | D | E | | | |
| 𝔸 | 𝔹 | ℂ | 𝔻 | 𝔼 | ? | ? | ? |
| ? | — | — | — | ? | F | G | H |

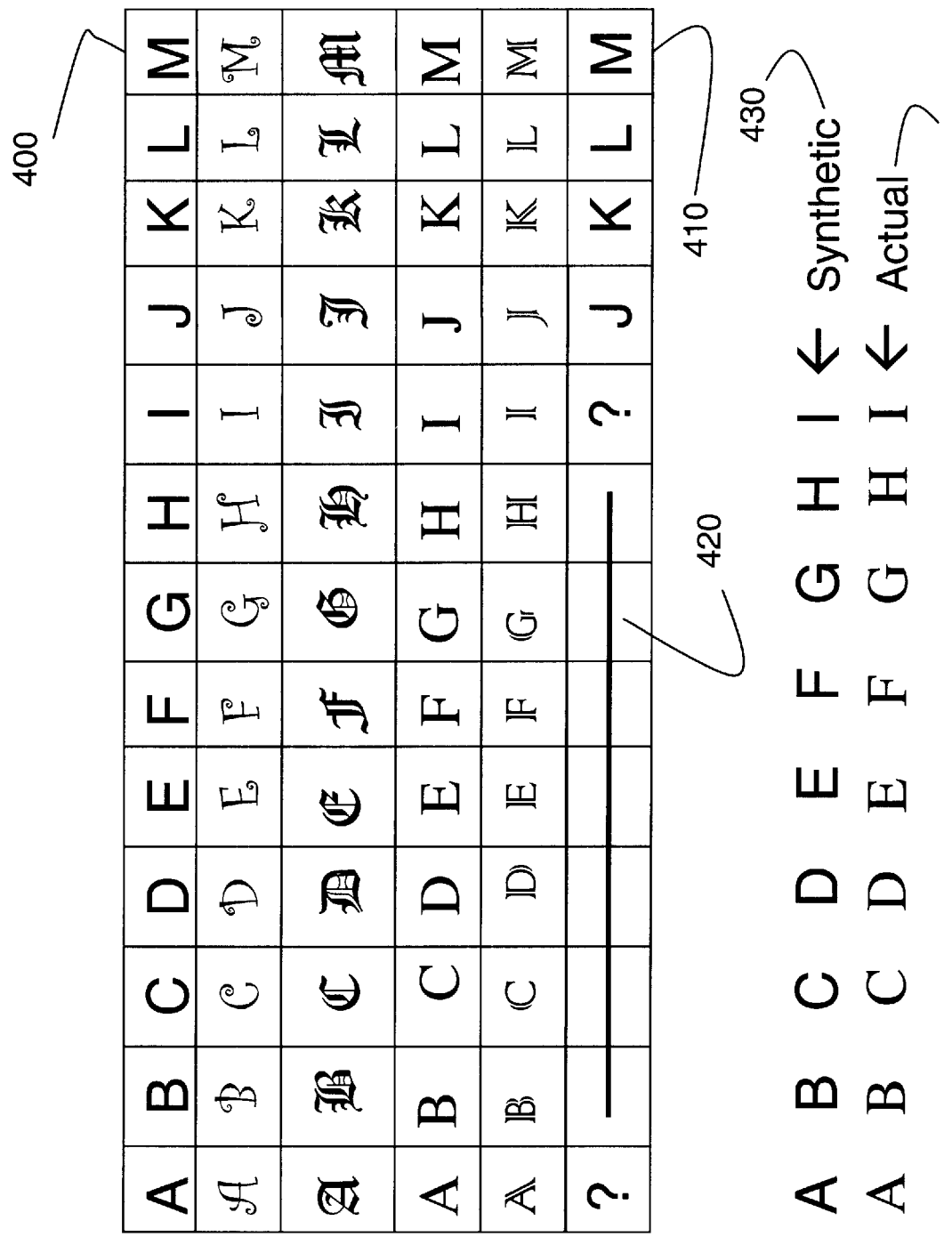

SYSTEM FOR ANALYZING AND SYNTHESIS OF MULTI-FACTOR DATA

This application is a continuation-in-part of Provisional U.S. Application Serial No. 60/031,008, filed Nov. 15, 1997.

FIELD OF THE INVENTION

The present invention relates to a system for analyzing data in order to classify content of unknown data or to recreate missing content of data. More particularly, it relates to analysis of data which can be represented as matrices of multiple factors.

BACKGROUND OF THE INVENTION

Many learning problems require recognition, classification or synthesis of data generated through the interaction of multiple independent factors. For example, an optical character recognition system may be used to recognize characters in an unfamiliar font. Speech analysis requires recognition of words by different speakers having different tonal characteristics. An adaptive controller may need to produce state-space trajectories with new payload conditions. Each of these types of problems can be decomposed into two factors, each having multiple elements, which interact to create the actual data. For ease of discussion, the two factors will be called "content" and "style". For example, in typography used for optical character recognition, each character includes as content a letter (A, B, C, etc.) and as style a font (Times, Helvetica, Courier, etc.). In both printing and handwriting, people can generally recognize letters independent of the font or handwriting. However, optical character recognition systems generally are based upon template comparisons. Thus, they do not operate well with unknown fonts, and are extremely poor with the variations in handwriting. Thus, such systems can not classify the elements of one factor (letter) independent of the other factor (font or handwriting).

Similarly, in speech analysis, the sound of words (content) which are spoken are greatly effected by the speaker (style). Thus, systems which analyze the sounds to determine patterns have difficulty with new speakers. This is also true for people, particularly when the speaker has a strong accent. However, after exposure to someone with an strong accent for a period of time, a listener can much more easily determine the words being spoken. The listener has learned to distinguish the content from the style in the speech. On the other hand, speech recognition systems must have specific training for each speaker. They do not generally recognize new speakers or accents, and cannot learn these over time.

Therefore, a need exists for a system which easily separates the content and style of data in order to recognize the content with new styles. A need exists for a system which can also create new content in a known style.

Theoretical work has been performed by others on modeling of data which is formed from a mixture of factors through Cooperative Vector Quantization (CVQ). G. E. Hinton and R. Zemel disclose theories relating to factorial mixtures in "Autoencoders, Minimum Description Length and Helmholtz Free Energy," NIPS 6, (1994). Z. Ghahramani discloses a system which applies mixture models to data analysis in "Factorial Learning and the EM Algorithm," NIPS 7, 657–674 (1995). In CVQ, as used in these systems, each element of each factor is assigned a code vector. Each data point is modeled as a linear combination of one code vector from each factor. Thus, the factors interact only additively. The linear nature of the models suggested by these researchers severely limits the modeling capability of their theories. Often, factors do not interact only additively. For example, in typography, the letter and font are not additively combined to form each character. Instead, the font can significantly modify certain characteristics of each letter.

Therefore, a need exists for a system which models complex interactions between factors and yet which allows for simple processing of the model in analyzing data.

SUMMARY OF THE INVENTION

The deficiencies of existing systems and of theoretical approaches previously made on multiple factor problems are substantially overcome by the present invention which provides a computer-based system for analyzing multiple factor data.

According to one aspect of the invention, data is modeled as a product of two linear forms corresponding to parameters of each factor. The data may or may not result from physical processes having a bilinear form that is used to model the data. But, by increasing the dimensionality of the bilinear forms sufficiently, the model can represent known training data to an arbitrary accuracy.

According to another aspect of the invention, the system determines the model parameters from training data having multiple factor interaction. Typically, the training data is a complete matrix of observations as to each content and style type. However, for some analyses, the training data may be fully labeled as to content and style, unlabeled, or partially labeled. Furthermore, the system can reasonably determine parameters from training data having unknown observations within the matrix. To determine the parameters, the system creates a model based upon parameter vectors for each of the factors and a combination matrix for combining the parameter vectors for each factor. The values of the elements in the parameter vectors and the combination matrix are iteratively determined based upon the training data, using Estimation-Maximization (EM) techniques.

According to another aspect of the invention, once parameter vectors are obtained, the system can be used to analyze unknown data. The analysis can be used to categorize content of data in an unknown style. In this manner, the system can be used to recognize letters in new styles in connection with optical character recognition, or words with new speakers. The analysis can also be used to create new content in a known style. Thus, the system can complete missing data, such as generating missing characters for a given font.

BRIEF DESCRIPTION OF THE DRAWING

FIGS. 1A–1C represent training data and types of analyses of unknown data.

FIG. 4 illustrates results of extrapolation analysis in optical character analysis.

DETAILED DESCRIPTION

Figure 2:
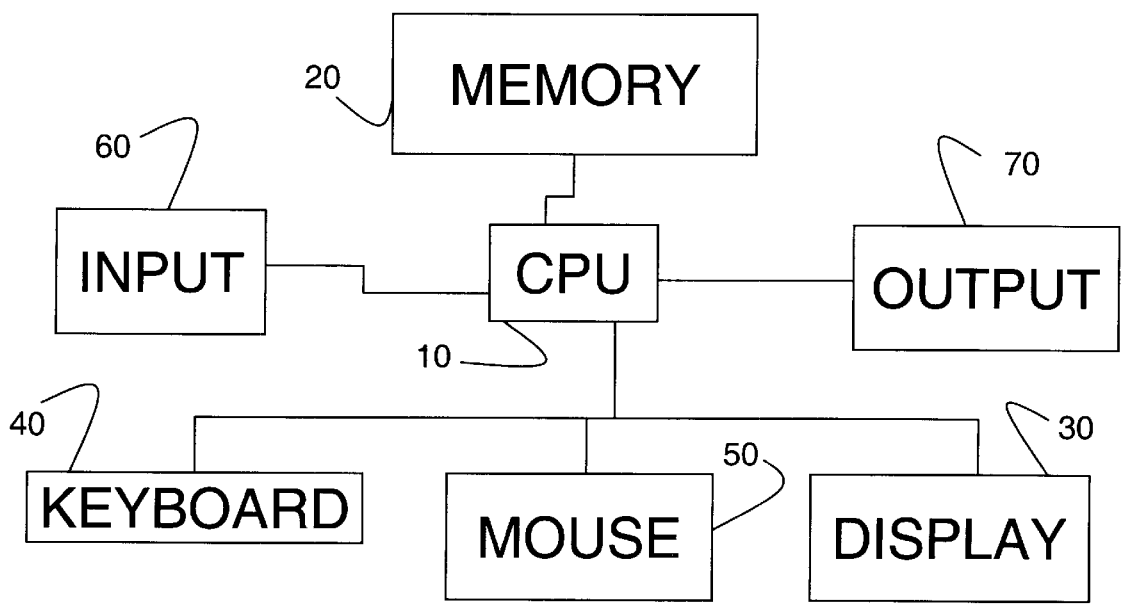
FIG. 2 represents computer hardware which can be used in implementing the present invention.

The present invention uses bilinear models for analyzing known and unknown data. Bilinear models represent data which can be decomposed into two or more factors. Two factors can be considered "content" and "style". FIGS. 1A–1C illustrate the two factors as they apply to typography fonts. The content is the letter being represented, and the style is the font. The examples below relate to two factors, however, the processes of the present invention can be easily expanded to include any number of factors.

In an embodiment of the present invention, each data point is modeled as a separable function of the underlying factors, that is, a product of linear forms corresponding to the parameters of a factor. This allows each factor to operate on the output of the model with an arbitrary affine transformation. Different factorial models could be used to represent the data and factors. While not all stylistic operations correspond to affine transformations, a simple linear model based upon vectorial representations of the factors provides sufficiently accurate processing results with easy learning. Of course, more complex, nonlinear models could be used to represent the factor interactions, but increasingly complex computations would be necessary to both learn and apply the factor parameters. A symmetric version of the model is represented as equation (1).

$$Y_k^{SC} = \sum_{i=1}^{I} \sum_{j=1}^{J} a_i^s g_{ijk} b_j^c \tag{1}$$

In this equation, $Y_k^{SC}$ is the kth vector component of the observed data at style index S and content-class index C, $a^s$ is an I-dimensional vector representing parameters of the first factor for the style index S, $b^c$ is a J-dimensional vector representing parameters of the second factor for the content class index C, $g_{ijk}$ is an I×J matrix representing the interaction between the two factors for the kth output component. With additional factors, additional parameter vectors would be included in the multiplicand of equation (1), the combination array, g, would have as many dimensions as there were factors, and the product would be summed over all factors.

The invention is not limited to modeling data arising from physical processes with linear interactions. While the factors interact linearly in the bilinear model, the linearity of physical processes is not required. Parameters of a factor are not necessarily associated with actual or known variables of the factor. They represent a linearity of some virtual variable. For example, the function $y = c3x^3 + c2x^2 + c1x$ is a cubic equation in variable x. On the other hand, it can be considered a linear equation of a vector $B = (x^3\ x^2\ x)$. Since the parameter vectors have no specific correspondence with actual variables in the factor, increasing the dimensions of the vectors can incorporate non-linearities in the variables actually underlying a factor. Furthermore, since the parameter vectors and combination matrix of equation (1) are learned from actual training data through an iterative process, as described below, the number of dimensions in the parameter vectors are only limited by the quantity of known data used during the training process.

In the model of equation (1), the separate factors contributing to each data point are not discernible. In some cases, one or more of the factors is of particular importance. In such situations, a second, asymmetric version of the model, equation (2), can be used. In equation (2), A is a matrix representing the first factor, b is again the parameter vector for the second factor. Thus, A is the product of a and g of equation (1). By using equation (2), different elements for both the parameter vector for the first factor and the combination matrix do not have to be determined. Thus, equation (2) can provide meaningful information with less learning data than for equation (1).

$$Y_k^{SC} = \sum_{j=1}^{J} A_{jk}^s b_j^c \tag{2}$$

The bilinear models are used as a basis for determining parameters from known, training data, and also analyzing unknown data based upon the determined parameters. FIGS. 1A–1C illustrate possible analyses of data using the present invention. In each of these figures, 340 represents a matrix of known data used in the training process. As illustrated, the matrix includes five known styles and five known content types. Once parameters are learned, unknown data can be analyzed for classification (FIG. 1A), extrapolation (FIG. 1B), and translation (FIG. 1C). For classification, the unknown data 350 includes uncategorized data in a new style. The system determines the proper categories, i.e., letters, from the data. For extrapolation, the system generates new data points from a new set of observations. As illustrated in FIG. 1B, the system can determine missing content (represented by "?" 360) in a new style 365. Similarly, missing styles of new content can also be determined. Finally, in translation, the system generates content 370 and style 380 data with data having both new content and new style 375.

FIG. 2 illustrates computer hardware 1 which can be used in connection with the present invention. A set of instruction steps are stored in a memory 20 and executed on a central processing unit (CPU) 10 connected to the memory 20. The memory may be of any known type, such as RAM, ROM, CD-ROM, and magnetic disk or tape. The CPU 10 is also connected to a display 30 for outputting information to the user as necessary during execution of the instructions. Input devices, such as a keyboard 40 and mouse 50, are connected to the CPU 10 to allow inputs by the user in controlling execution of the instructions. An input 60 is also connected to the CPU 10 for inputting data to be acted upon by the system of the present invention. The data as inputted through the input 60 can be stored in the memory 20 during processing. Alternatively, a memory (not shown) separate from the memory having the executable instructions may be used for storing the data. An output 70 allows information relating to the data to be outputted by the CPU 10.

Figure 3:
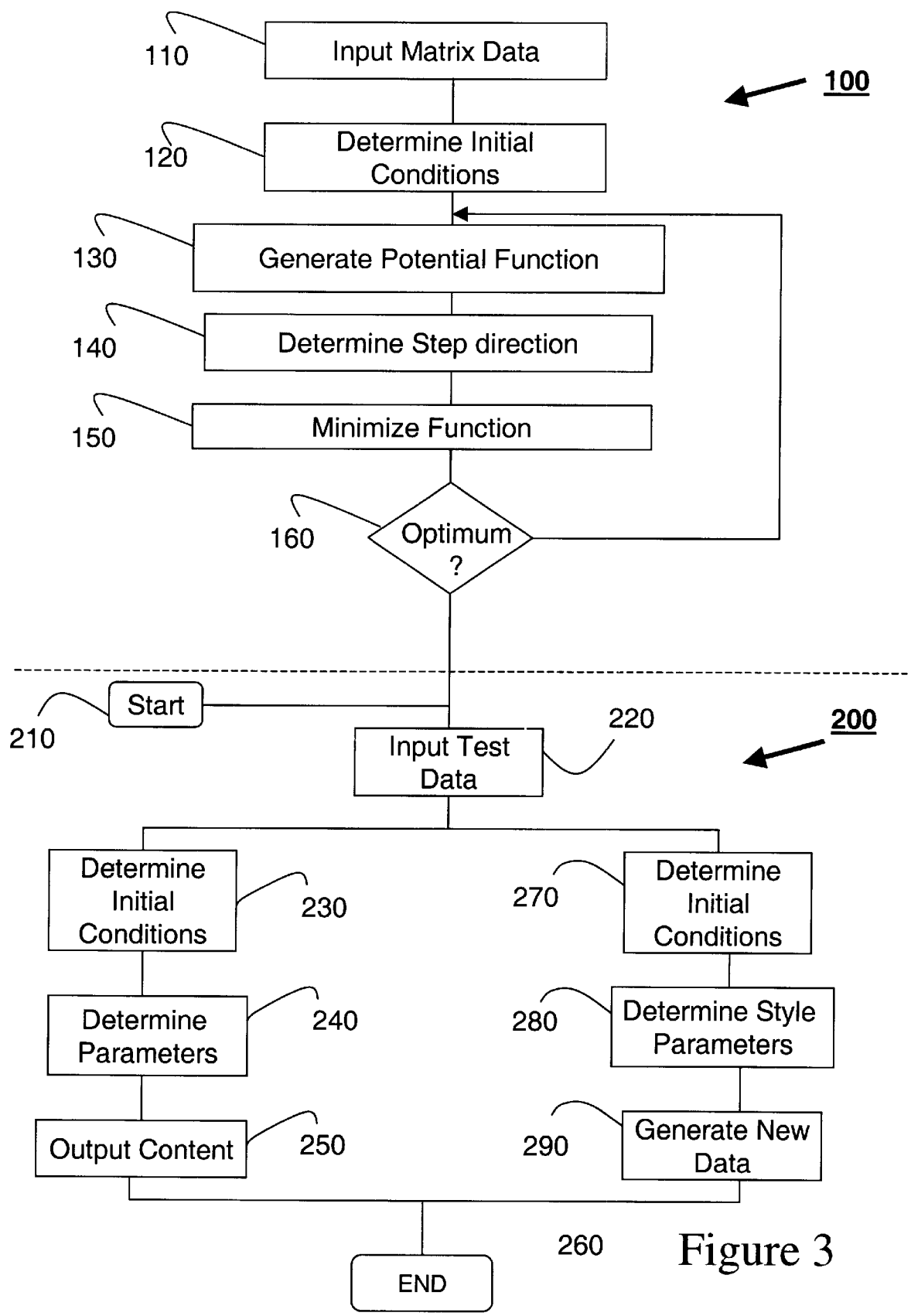
FIG. 3 is a flow diagram for operation of the present invention.

FIG. 3 is a flow diagram for operation of the system of the present invention. The system operates in two parts. In a training process 100, matrixed data is analyzed to determine parameters for each of the two factors. In an application process 200, which follows the training process 100, the parameters for the two factors are applied to unknown data to determine missing information, as discussed above. The application process 200 can occur at any time following the training process, and can be repeated any number of times with different unknown data. The training process 100 can also be repeated with the new data, creating a larger matrix of known data, in order to more closely determine the parameters for the factors.

Several methods can be used to fit the training data to an appropriate model. A method is selected based upon the amount and type of information in the training data. The training data may be labeled, unlabeled or partially labeled. Thus, for the typographic data of FIG. 3, each letter may be categorized by the letter value and font. Alternatively, the letter values may be known, but the fonts unknown (or vice versa). Also, the letters and fonts may not be given. Also, either equation (1) or equation (2) is selected as the model, depending upon the data and the desired applications.

No matter what the select process for fitting the training data, the process is based upon use of singular value decomposition (SVD) with bilinear functions. If the training data includes a complete matrix of both known styles and content, the SVD process can be used directly, as discussed below. This process is not specifically illustrated in FIG. 3. Also, use of singular value decomposition for fitting the asymmetric model to the training data is described in J. Koenderinck and A. van Doorn, *Int'l Journal of Computer Vision* (1997), incorporated herein by reference. the symmetric model, the use of singular value decomposition is described in D. Marimount and B. Wandell, *Journal of the Optical Society of America,* A 9, 1905 (1992), incorporated herein by reference.

When a complete matrix of training data is given, k-dimensional vectors are created as the means of the observed data in a given style and content. The vectors are then formed into a observation matrix with rows and columns corresponding to style and content. To fit the asymmetric model, the SVD of Y ($USV^T$) is computed. The first J columns of U are defined as the matrix A, and the first J rows of $SV^T$ are defined as matrix B. The model dimensionality J can be chosen by prior knowledge, by requiring a sufficiently good approximation to the data, or by looking for a gap in the singular value spectrum. Matrices A and B are identified as the parameter estimates.

For the symmetric model, an iterative procedure can be used to fit the model parameters to determine a locally optimal solution. The SVD is applied as for the asymmetric model, but with a reordering of the observation matrix elements to alternate the roles of the style and content factors. Convergence in the iterative process has typically been achieved within 5 iterations.

FIG. 3 illustrates the slightly more complicated process used when less that complete information is known about the training data. This can result from either missing data, or from missing labels (as to content or style) on some or all of the training data. In the training process 100 as illustrated in FIG. 3, at step 110, known data is received. The known data includes data points and the respective position in both factors. Thus, for the typographic data shown in FIG. 3, the known data consists of the bit pattern for each letter, the corresponding letter, and the font. At step 120, initial values for the parameter vectors are determined. This provides a starting point for the EM algorithm. Different techniques can be used to determine initial starting conditions. For example, arbitrarily determined values can be assigned to each of the variable. Alternatively, different processed can be used to provide more accurate initial conditions. Thus, when learning new fonts, the parameter vectors for the letter, and the combination matrix for typography likely provide a good starting place. In fact, this is the initial starting condition during the application process.

At step 130, a potential function is generated based upon the initially determined conditions. The potential function is the sum of the squared difference between each component of the model output and the training data, summed over all components of all the training data. Standard least squares techniques to find the parameter values which minimize the sum of squared differences between the model and the data. The model output is given by either equation (1) or equation (2), depending on which model is used. Once a value for equation (3) has been determined (step 4), a new step direction is determined at step 140. The step direction refers to the variable being changed and to the size of the change. With arbitrary values for the parameters, each of the factor parameter vectors are successively selected for minimization. General minimization techniques are then used to determine the size of changes to parameters for that vector at step 150. The generation of the potential function 130, determine step direction 140, and minimize the function 150 steps are repeated until an optimum (step 160) is reached. The parameter vectors for each factor are then stored or outputted as the model for the data.

The model information is used during the application process 200 in order to analyze new data for classification, extrapolation, or translation. As illustrated in FIG. 3, the first step of the application process is to input the test data (step 220). This step may immediately follow the training process, or can begin at some later time, by entry through step 210. After the test data has been inputted, the system has two different potential process as, one for classifying the data as to content or style, and one for generating new data also as to content or style. FIG. 3 illustrates classification of content in a new style (steps 230–250) and generation of content in the new style (steps 270–290). The same processes can be used with the parameters for style and content reversed in order to classify new content as to style or to generate old styles with new content. The processes are similar to the process for determining the parameters during the training process.

$$\Sigma(y_k - a_i^s g_{ijk} b_j)^L \qquad (3)$$

In one embodiment, an iterative least squares approach can be used to apply a derived model to new data. Equation (3) illustrates an equation to be minimized in order to find the appropriate parameters for the symmetric model of equation (1) for the new data. For each data point, the difference between the value of equation (1) with estimated parameters and the actual data point is minimized. The minimization is obtained by fixing two of the values (e.g. b and g) and minimizing using general least squares techniques for the third value (e.g. a). Then, the process is repeated for each of the other variables. The process is further iteratively performed on each of the variables to find the true minimum. For classification in a new style, both the content labels and style parameters for the new data must be determined. If the content labels were known, the style parameters could be determined as in training. With the content labels being unknown, the system uses a separable mixture model to efficiently fit the data using EM techniques. The separable mixture model is formed by embedding the bilinear model in a gausian mixture model. To simplify the process, an additional parameter, representing an assignment variable, is added to the content vector. This variable will have a value of 1 for the specific content and a value of 0 at all other positions. The application process is also based upon use of an expectation-maximization (EM) algorithm applied to factorial mixture models. These processes allow easy analysis of the modeled data. The EM algorithm is executed by successively alternating between E (expectation) and M (maximization) steps. Thus, the process operates to fit an equation with parameters to be determined to the data. At step 230, initial conditions are set. Clearly, the initial conditions should include the content parameter vector and the combination matrix as determined during the training process, since only the style of the new data will have changed. Initial conditions for the style parameter can be set randomly, set at an average of parameters for known styles, or otherwise selected.

The system then determines the style parameters and assignment variables in the content parameters at step 240. The initial values of the assignment variables assigning a content class to each observation are set to the content class of the most similar observation in the training set. For classification of content in new styles, it is assumed that the probability of a new, unlabeled observation being generated by a new style and known content has a gaussian distribution centered at the prediction of the bilinear model. The total probability is then given by a mixture distribution. The previous probabilities are equally set to sum to 1 over all styles and contents. Since the content vectors are known from the training process, the EM process alternates between two steps to find style matrices and labels to best describe the new data. In the first step (E), the probabilities that each test vector belongs to a specific style and content are estimated using the current style matrix estimates. In the second step (M), the new style matrices are estimated to maximize the total log likelihood (L=Σlog p(y)) of the test data. The M-step can be computed in a closed form by solving the equations $\partial L/\partial A=0$, which are linear given the probability estimates from the E-step. The EM algorithm is guaranteed to converge to a local minimum. Typically, 10–20 iterations have been used to reach convergence. Upon convergence, test vectors in new styles can be classified by selecting the content class which maximizes the total probabilities. The assignment variables are output as the content of the unknown data at step 250, and the process ends (step 260).

The system can also generate missing data in a new style (extrapolation or translation), as illustrated in steps 270–290. First, the parameter vector for the new style must be learned based upon the known data. At step 270, initial conditions are set. As discussed above, different mechanisms can be used to set the initial conditions, such as using the average of parameters for known styles. Then, based upon the known content, the parameters for the new style are determined at step 280. As with the training process, the parameters are determined by generating a potential function and minimizing it.

If the data is not labeled for content, the content parameters will need to be adjusted to include the assignment variable discussed above. In this manner, the style parameters and the content of the new data are determined. Once the style parameters of the new style are determined, the new style parameter can be combined, using the combination matrix, with the content parameter vectors for the missing data according to the model. Then, the processing ends.

The system of the present invention has been tested for analyzing typographic symbols, voice recognition, head pose, head illumination, and color constancy. In the system application to typographic symbols, the characters were represented by 2×38×38 dimensional vectors of displacements that a set of ink particles must undergo from a reference configuration to form the target shape, referred to as a warp representation. In order to have similar warps representing similar letters, a physical model was used. Each pixel in the reference shape was considered to have a positive charge, and each pixel in the target shape to have a negative charge. The electrostatic force lines, calculated from Coulomb's law, from each particle in the reference shape to the plane of the target letter were tracked, and set to be in front of a parallel to the reference shape. The force lines land in a uniform density over the target letter and result in a smooth, dense warp map. Of course, other representations of the letter can also be used.

The data in FIG. 4 represents a portion of the training set for this application of the system. The system was trained using training data 400 and the model of equation (2) to determine separate Ai models for the five fonts, and separate bi models for each of the 62 characters (A–Z, a–z, 0–9). The model dimensionality (I, J) were set to 30 for all of the models, and each of the pixels were treated as separate data elements (k). After the models were learned, another font was used for testing the application for generating missing data in a new style. A subset of the testing data 410 is illustrated in the bottom row of FIG. 4. FIG. 4 also illustrates the characters as generated by the model 430 the actual missing characters in the new font 440. Initial conditions for the application process were determined by utilizing the optimal linear combination of the five training styles. This allowed the process to estimate the parameters with minimal training and new data.

Head pose relates to the direction that a person is facing relative to a camera. In this case, the subject was the style and the head direction was the content. The training set consisted of eleven subjects and fifteen directions. After determining the parameter vectors and combination matrix using equation (1), the system was applied to determine directions for unknown subjects. The system found the correct direction for 55% of trials, and was within one location of the correct direction for 93%. This compares to 48% exact matches and 87% within one location for a nearest neighbor approach. Of course, additional training sets or larger dimensional vectors could be used to obtain more accurate parameters and increase the efficiency of the system.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A computer-based apparatus for analysis and synthesis of multi-factor data comprising:

means for storing a plurality of observed data values, wherein the data is definable by at least two separable factors;

parameter means for determining a parameter vector for each of the at least two separable factors based upon the observed data; and matrix means for determining at least one combination matrix representing interaction between the at least two factors, based upon the observed data.

2. The apparatus of claim 1, wherein each of the observed data values includes a plurality of components, and wherein the matrix means determined a combination matrix corresponding to each component of the data values.

3. The apparatus of claim 1, further comprising:

means for receiving at least one test data;

means for determining at least one parameter vector for at least one factor for the at least one test data.

4. The apparatus of claim 1, further comprising:

means for receiving a plurality of test data having a different factor value than the observed data for at least one factor;

means for determining a test parameter vector for the at least one factor of the test data; and means for generating new data based upon the test parameter vector.

5. A computer-based apparatus for analysis and synthesis of multi-factor data comprising:

means for storing a plurality of observed data values, wherein the data is definable by at least two separable factors;

parameter means for determining a parameter vector for at least one separable factor based upon the observed data; and matrix means for determining a parameter matrix for at least one other separable factor based upon the observed data.

6. A method for analyzing multi-factor data, comprising the steps of:

representing parameters of known multi-factor data as a bilinear model; and analyzing unknown multi-factor data based on the represented parameters to determine one of a factor of data included in the unknown multi-factor data and a factor of data missing from the unknown multi-factor data.

7. A method according to claim 6, wherein:

each parameter represents a product of linear forms corresponding to a first factor and a second factor, different than the first factor, of data included in the known multi-factor data; and the determined factor is one of the first factor and the second factor.

8. A method according to claim 7, wherein the first factor is content and the second factor is style.

9. A method according to claim 6, wherein the analyzing of unknown multi-factor data includes at least one of:

categorizing parameters of the unknown multi-factor data based on the represented parameters of the known multi-factor data to determine the factor;

extrapolating parameters of the unknown multi-factor data from the represented parameters of the known multi-factor data to determine the factor; and translating parameters of the unknown multi-factor data from the represented parameters of the known multi-factor data to determine the factor.

10. A method according to claim 9, further comprising the step of:

modifying the bilinear model to represent one of the categorized parameters, the extrapolated parameters, and the translated parameters of the unknown multi-factor data.

11. A method according to claim 6, wherein the bilinear model is one of a symmetric bilinear model and an asymmetric bilinear model.

12. A system for analyzing multi-factor data, comprising:

a memory configured to store a bilinear model representing parameters of known multi-factor data; and a processor configured to receive unknown multi-factor data and to determine one of (i) a factor of data included in the unknown multi-factor data and (ii) a factor of data missing from the unknown multi-factor data, based on the stored bilinear model.

13. A system according to claim 12, wherein:

each of the parameters represented in the bilinear model represents a product of linear forms corresponding to a first factor and a second factor, different than the first factor, of data included in the known multi-factor data; and the determined factor is one of the first factor and the second factor.

14. A system according to claim 13, wherein the first factor is content and the second factor is style.

15. A system according to claim 12, wherein the processor is further configured to determine the factor of the unknown multi-factor data by at least one of:

categorizing parameters of the unknown multi-factor data based on the represented parameters of the known multi-factor data to determine the factor;

extrapolating parameters of the unknown multi-factor data from the represented parameters of the known multi-factor data to determine the factor; and translating parameters of the unknown multi-factor data from the represented parameters of the known multi-factor data to determine the factor.

16. A system according to claim 15, wherein the processor is further configured to modify the bilinear model to represent one of the categorized parameters, the extrapolated parameters, and the translated parameters of the unknown multi-factor data.

17. A system according to claim 12, wherein the bilinear model is one of a symmetric bilinear model and an asymmetric bilinear model.

* * * * *